US010516802B1

(12) United States Patent
Satomi

(10) Patent No.: US 10,516,802 B1
(45) Date of Patent: Dec. 24, 2019

(54) IMAGE PROCESSING DEVICE

(71) Applicant: KYOCERA Document Solutions Inc., Osaka (JP)

(72) Inventor: Seiki Satomi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/448,029

(22) Filed: Jun. 21, 2019

(30) Foreign Application Priority Data

Jun. 26, 2018 (JP) .................................. 2018-121399

(51) Int. Cl.
*H04N 1/387* (2006.01)
*H04N 1/393* (2006.01)

(52) U.S. Cl.
CPC ......... *H04N 1/3877* (2013.01); *H04N 1/3935* (2013.01)

(58) Field of Classification Search
CPC ............................ H04N 1/3877; H04N 1/3935
See application file for complete search history.

(56) References Cited

U.S. PATENT DOCUMENTS

| 2004/0190791 A1* | 9/2004 | Oyabu | H04N 1/393 |
| | | | 382/298 |
| 2011/0206293 A1* | 8/2011 | Sasaki | G06T 5/008 |
| | | | 382/274 |
| 2016/0307298 A1* | 10/2016 | Chou | G06T 3/4007 |

FOREIGN PATENT DOCUMENTS

JP          2017-175463          9/2017

* cited by examiner

*Primary Examiner* — King Y Poon
*Assistant Examiner* — Michael Burleson
(74) *Attorney, Agent, or Firm* — Lex IP Meister, PLLC

(57) ABSTRACT

A read circuit outputs input pixel blocks to a line buffer. An arithmetic processing circuit reads an input pixel block from the line buffer and executes rotation processing to derive an output pixel block. A controller sets an output block height to the largest integer fraction of an output band height so that the output pixel block fits within an input band in an input pixel coordinate system, extends the width of the output pixel block so that the output pixel block fits within a maximum width of the input pixel block in the input pixel coordinate system, reduces the width of the output pixel block according to the size of the output pixel block in the input pixel coordinate system and the number of pixel lines in the line buffer, and sets the size of the input pixel block based on the size of the output pixel block.

4 Claims, 9 Drawing Sheets

IMAGE PROCESSING DEVICE

INCORPORATION BY REFERENCE

This application is based upon, and claims the benefit of priority from, corresponding Japanese Patent Application No. 2018-121399 filed in the Japan Patent Office on Jun. 26, 2018, the entire contents of which are incorporated herein by reference.

BACKGROUND

Field of the Invention

The present disclosure relates to an image processing device.

Description of Related Art

Image processing devices extract an input pixel block from an input image (page image), and rotate the pixel block to obtain a rotation-corrected output pixel block.

SUMMARY

An image processing device according to the present disclosure includes an input band buffer, a read circuit, an output band buffer, an arithmetic processing circuit, and a controller. The input band buffer stores an input band obtained by dividing an input image. The read circuit reads input pixel blocks from the input band stored in the input band buffer, and outputs the input pixel blocks to a line buffer having a specific number of pixel lines. The output band buffer stores an output band. The arithmetic processing circuit reads pixel lines of the input pixel blocks from the line buffer, executes rotation processing of the input pixel blocks to derive output pixel blocks, and stores the output pixel blocks in the output band buffer as part of the output band. The controller determines the size of each of the output pixel blocks according to the rotation angle in the rotation processing, and sets the size of each of the input pixel blocks to the read circuit based on the size of the output pixel block. Further, the controller: (a) executes block size determination processing for determining the size of the output pixel block; and (b) in the block size determination processing, (b1) sets an output block height of the output pixel block to the largest integer fraction of an output band height of the output band so that the output pixel block fits within the input band in an input pixel coordinate system, (b2) extends the width of the output pixel block so that the output pixel block fits within a specific maximum width of the input pixel block in the input pixel coordinate system, (b3) if the output pixel block after extending the width of the output pixel block does not fit within the input band in the input pixel coordinate system, reduces the width of the output pixel block so that the output pixel block fits within the input band and the width of the output pixel block is maximized, (b4) if the number of pixel lines of the input pixel block corresponding to one pixel line of the output pixel block exceeds the number of pixel lines in the line buffer reduces the width of the output pixel block so that the number of pixel lines of the input pixel block corresponding to one pixel line of the output pixel block after reducing the width of the output pixel block becomes less than or equal to the number of pixel lines in the line buffer, and (b5) sets the size of the input pixel block to the read circuit based on the output block height of the output pixel block and the width of the output pixel block.

DETAILED DESCRIPTION

An embodiment of the present disclosure is described below with reference to the accompanying drawings.

First Embodiment

Figure 1:
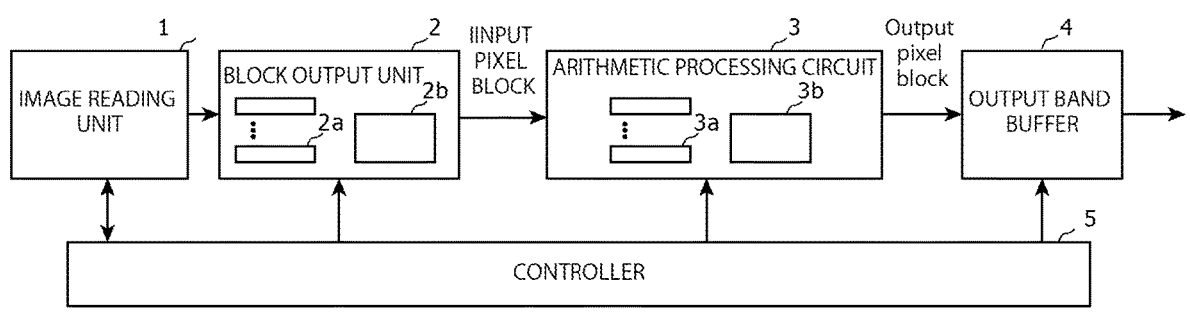
FIG. 1 is a block diagram showing the configuration of an image processing device according to an embodiment of the present disclosure.

FIG. 1 is a block diagram showing the configuration of an image processing device according to an embodiment of the present disclosure. The image processing device shown in FIG. 1 is, for example, a scanner, a copier, a facsimile machine, or a multifunction peripheral, which optically reads a document image from a document, and rotates the document image by hardware processing.

The image processing device shown in FIG. 1 includes an image reading unit 1, a block output unit 2, an arithmetic processing circuit 3, an output band buffer 4, and a controller 5.

The image reading unit 1 includes a platen glass, an automatic document feeder, an image reading optical system, an imaging element, an image data generation circuit, and the like, and causes the imaging element to capture, by means of the image reading optical system, a document image in a document placed on the platen glass or in a document delivered by the automatic document feeder, and outputs, by means of the image data generation circuit, image data of the document image (input image) read by the imaging element. Here, the imaging element is a line sensor, and the image reading unit 1 outputs image data of an input image one pixel line at a time.

In terms of operation modes, the image reading unit 1 is capable of executing in a first mode which reads a document image from a document fed by the automatic document feeder, and a second mode which reads a document image from a document placed on the platen glass.

For example, the automatic document feeder includes a sensor that detects that a document has been set in place in the automatic document feeder, such that the image reading unit 1 reads an image in the first mode when a document is detected by the sensor, and if not, reads an image in the second mode.

The block output unit 2 receives the image data output from the image reading unit 1 one pixel line of the input image at a time, stores the pixel lines in an input band buffer 2*a*, and reads and outputs input pixel blocks in order from the input band buffer 2*a* by means of a read circuit 2*b*.

Specifically, the input band buffer 2*a* stores one or more input bands (having a specific number of pixel lines) obtained by dividing an input image (here, a page image). Furthermore, the read circuit 2*b* reads an input pixel block from an input band stored in the input band buffer 2*a*, and outputs the input pixel block one pixel line at a time in order to a line buffer 3*a* having a specific number of pixel lines.

The arithmetic processing circuit 3 reads the pixel lines of an input pixel block in order from the line buffer 3*a*, executes rotation processing (at an arbitrary angle) of the input pixel block by means of an arithmetic unit 3*b* to derive an output pixel block, and stores the output pixel block to the output band buffer 4 as part of the output band.

The output band buffer 4 stores one or more output bands (having a specific number of pixel lines). A subsequent image processing circuit (not shown) sequentially reads image data from the output band buffer 4 and executes specific image processing.

For example, the line buffer 3*a* is a memory area reserved in a static RAM (not shown). The line buffer 3*a* has a memory area sufficient to store image data of a specific N (N>1) pixel lines.

Furthermore, for example, the input band buffer 2*a* and the output band buffer 4 are memory areas reserved in a static RAM or a dynamic RAM (not shown).

The controller 5 controls the image reading unit 1, the block output unit 2, the arithmetic processing circuit 3, and the like. In particular, the controller 5 sets the block size of an image block described above to a value that corresponds to the rotation angle. Here, the rotation angle may be set to an arbitrary angle by the user, or may be automatically set such that the inclination angle of a document image (input image), which is automatically detected from a read image by a known method, is set to zero.

Specifically, the controller 5 firstly determines the size of an output pixel block (the height in a secondary scanning direction and the width in a primary scanning direction) according to the rotation angle in the rotation processing described above, sets the size of the output pixel block to the arithmetic processing circuit 3, specifies the size of an input pixel block corresponding to the size of the output pixel block, and sets the size of the input pixel block to the read circuit 2*b*.

At this time, the controller 5 executes block size determination processing for determining the size of the output pixel block.

Figure 2:
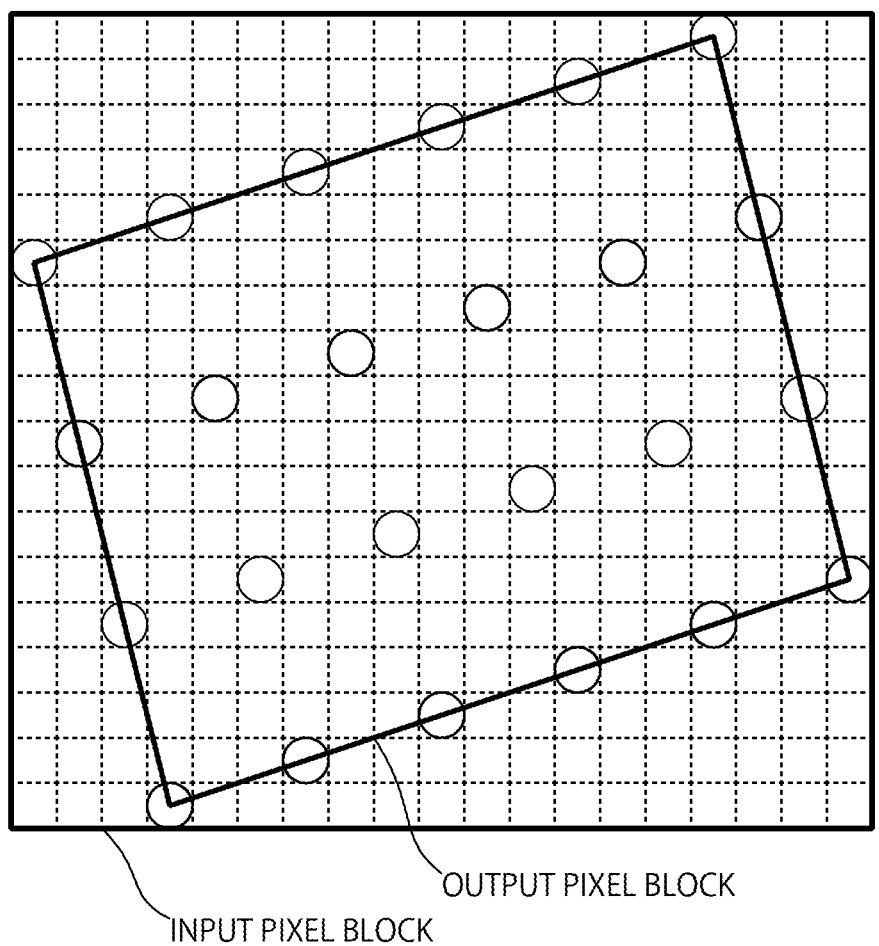
FIG. 2 is a diagram for explaining the correspondence between an input pixel block and an output pixel block in an input pixel coordinate system.
Figure 3:
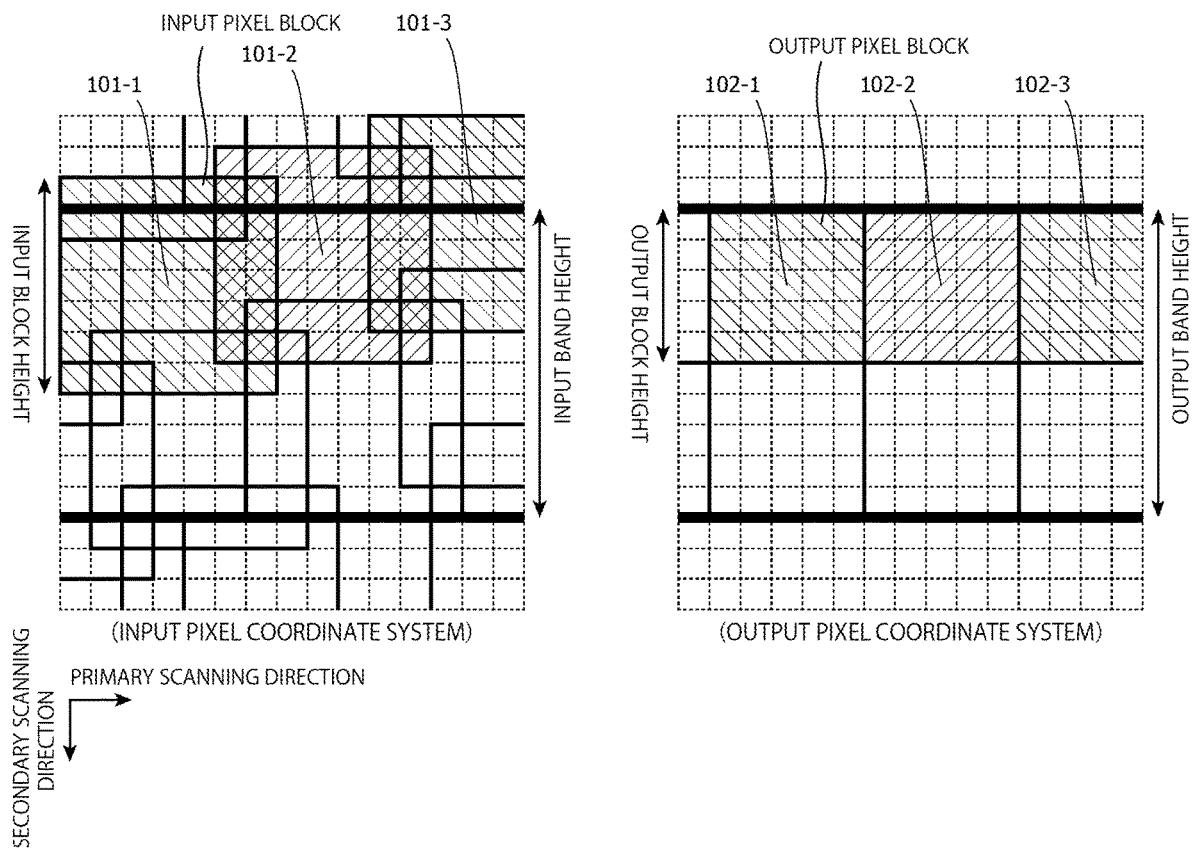
FIG. 3 is a diagram for explaining the size of an input pixel block in an input band, and the size of an output pixel block in an output band.

FIG. 2 is a diagram for explaining the correspondence between an input pixel block and an output pixel block in an input pixel coordinate system. FIG. 3 is a diagram for explaining the size of an input pixel block in an input band, and the size of an output pixel block in an output band. It is necessary for an input pixel block to be made larger than an output pixel block for rotation processing by the arithmetic processing circuit 3. Furthermore, the size of an input pixel block is determined according to the size of an output pixel block, and as the number of pixels in an input pixel block that do not contribute to the derivation of the pixel values of an output pixel block decreases, the storage efficiency and the like of the input pixel block improves. Moreover, as shown in FIG. 3, because size of an input pixel block size becomes larger than the size of an output pixel block due to rotation processing, mutually adjacent input pixel blocks overlap each other.

Specifically, in the block size determination processing, the controller 5 first sets the output block height of the output pixel block (that is to say, the number of pixel lines of the output pixel block) to the largest integer (positive number) fraction of the output band height of the output band (that is to say, the number of pixel lines of the output band) so that the output pixel block fits within the input band in the input pixel coordinate system.

Figure 4:
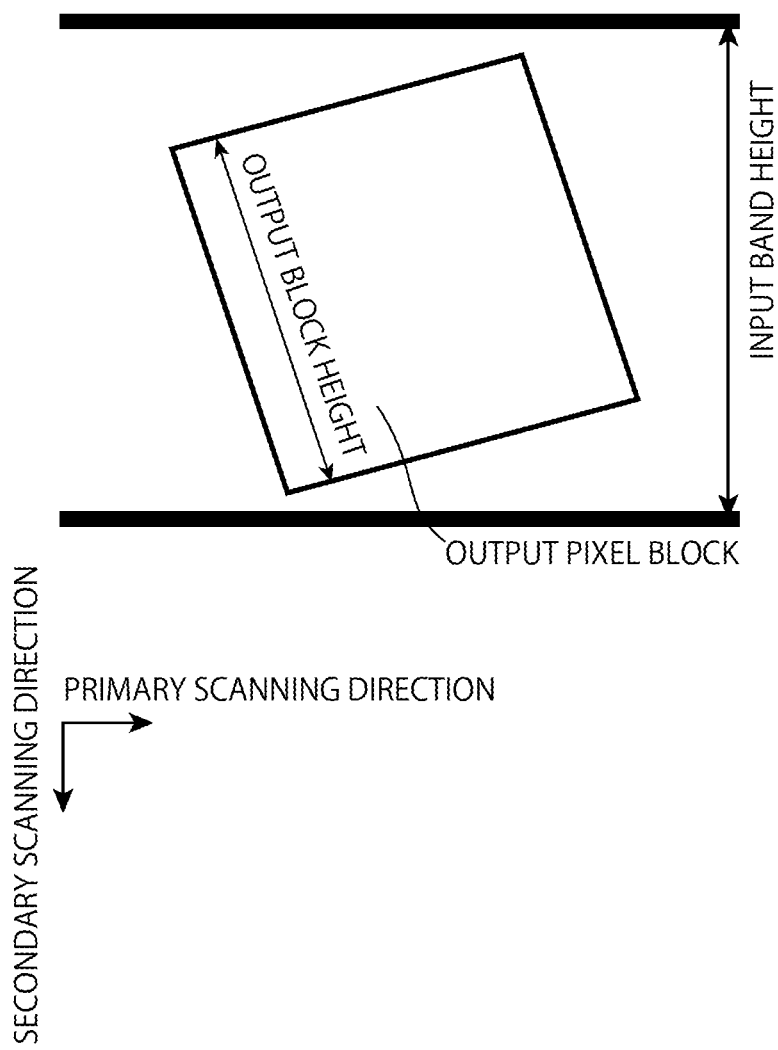
FIG. 4 is a diagram for explaining the selection of an output block height based on a restriction imposed by an input band height in a first embodiment.

FIG. 4 is a diagram for explaining the selection of an output block height based on a restriction imposed by an input band height in the first embodiment.

Firstly, the controller 5 sets the output block height equal to the output band height (that is to say, sets the output block height a maximum value), maps the output pixel block to an input pixel coordinate system as shown in FIG. 2 based on the rotation angle in the arithmetic processing circuit 3, and determines whether or not the output pixel block fits within the input band height in the height direction as shown in FIG. 4. If the current output pixel block mapped to the input pixel coordinate system fits within the input band height in the height direction, the output block height is confirmed as a value equal to the output band height.

The mapping from an output pixel coordinate system to an input pixel coordinate system is performed based on a specified rotation angle. Furthermore, the position of each pixel of the mapped output pixel block in the input pixel coordinate system is calculated in sub-pixel units (for example, in units of $1/65536$ pixels).

On the other hand, if the output pixel block mapped to the input pixel coordinate system does not fit within the input band height in the height direction when the output block height is set to a value equal to the output band height, the controller 5 sets the output block height to one-half the output band height, maps the output pixel block to the input pixel coordinate system, and determines whether or not the output pixel block fits within the input band height in the height direction. If the current output pixel block mapped to the input pixel coordinate system fits within the input band height in the height direction, the output block height is confirmed as a value one-half the output band height.

On the other hand, if the output pixel block mapped to the input pixel coordinate system does not fit within the input band height in the height direction when the output block height is set to a value one-half the output band height, the controller 5 sets the output block height to one-third the output band height, maps the output pixel block to the input pixel coordinate system, and determines whether or not the output pixel block fits within the input band height in the height direction. If the current output pixel block mapped to the input pixel coordinate system fits within the input band height in the height direction, the output block height is confirmed as a value one-third the output band height.

In the same manner thereafter, the output block height is reduced until the output pixel block mapped to the input pixel coordinate system fits within the input band height in the height direction, and the output block height at the point where the output pixel block mapped to the input pixel coordinate system fits within the input band height in the height direction is selected.

For example, in the case shown in FIG. 3, the output block height is set to one-half the output band height. In FIG. 3, the width of the output pixel block is equal to the output block height.

Figure 5:
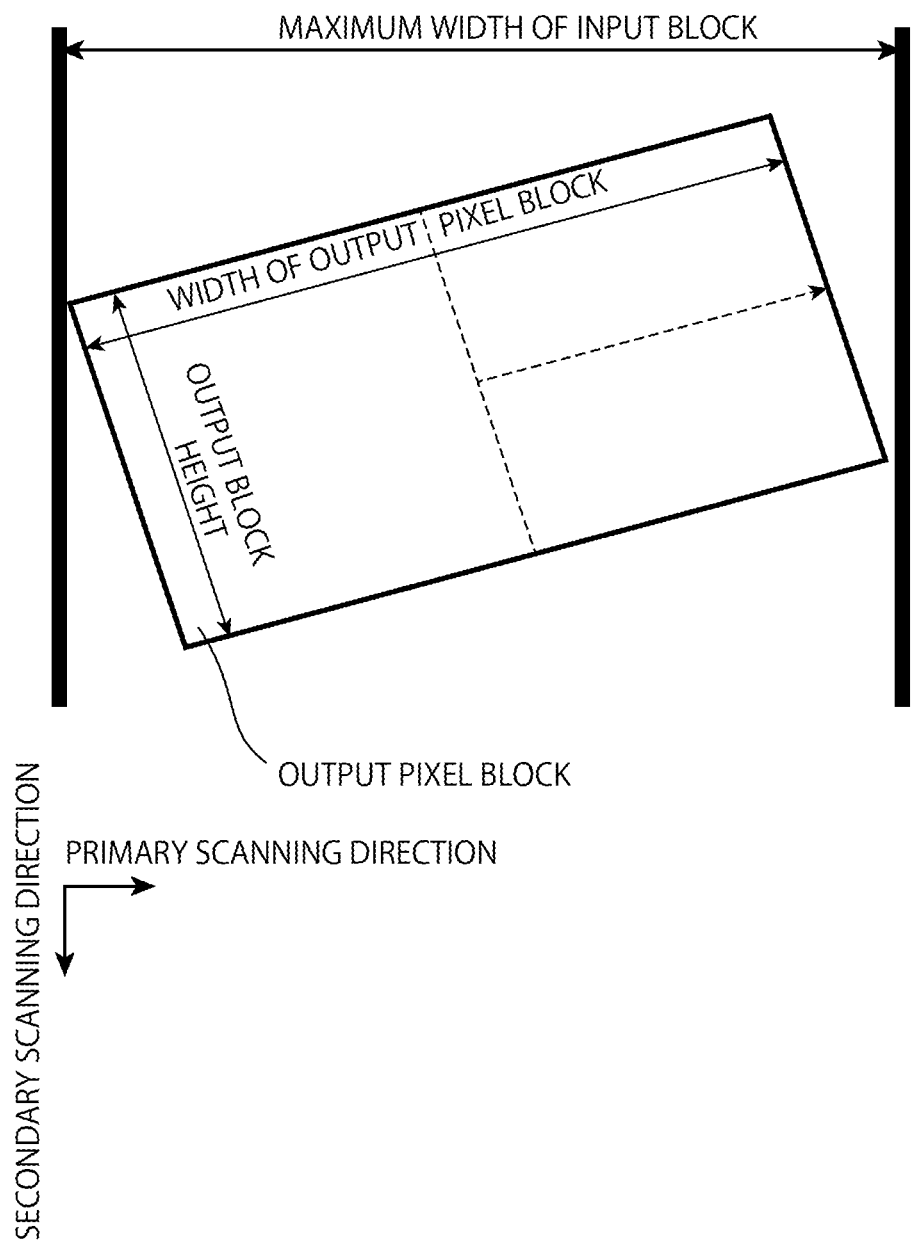
FIG. 5 is a diagram for explaining the setting of the width of an output pixel block based on a restriction imposed by a maximum width of an input pixel block in the first embodiment.

FIG. 5 is a diagram for explaining the setting of the width of an output pixel block based on a restriction imposed by a maximum width of an input pixel block in the first embodiment.

Next, in the block size determination processing, as shown in FIG. 5, the controller 5 extends the width (number of pixels) of the output pixel block so that the output pixel block fits within a specific maximum width of the input pixel block in the input pixel coordinate system. That is to say, the controller 5 maximizes the width of the output pixel block in a range in which the output pixel block fits within the specific maximum width of the input pixel block in the width direction in the input pixel coordinate system.

The specific maximum width (number of pixels) of an input pixel block is determined by the hardware configuration (for example, the width of the line buffer 3a of the subsequent arithmetic processing circuit 3 (that is to say, the number of pixels capable of storing pixel values with respect to one pixel line)).

Figure 6:
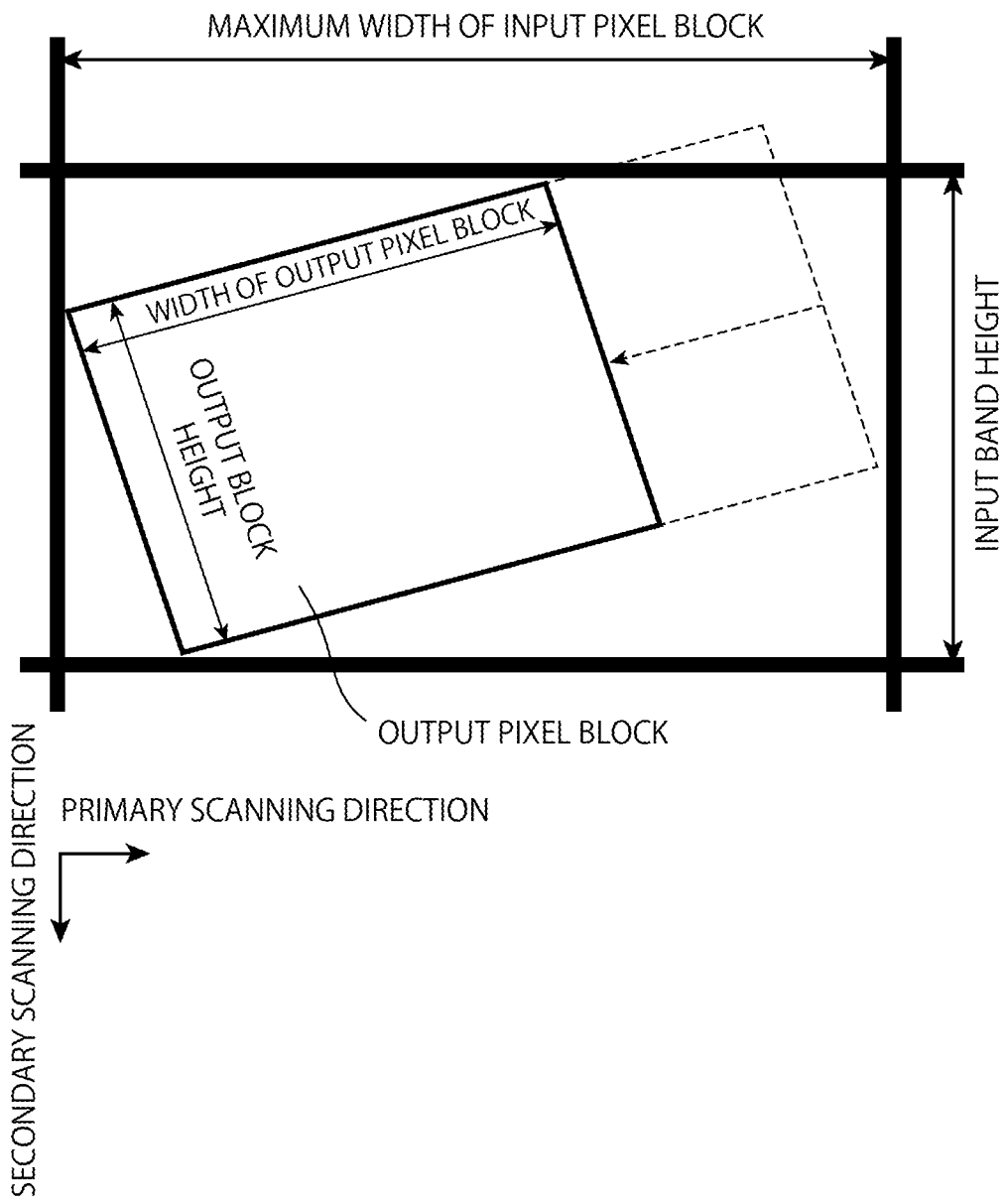
FIG. 6 is a diagram for explaining the reduction of the width of an output pixel block based on a restriction imposed by an input band height in the first embodiment.

FIG. 6 is a diagram for explaining the reduction of the width of an output pixel block based on a restriction imposed by an input band height in the first embodiment.

Next, in the block size determination processing, as shown in FIG. 6, if the output pixel block after extending the width of the output pixel block does not fit within the input band in the input pixel coordinate system, the controller 5 reduces the width of the output pixel block so that the output pixel block fits within the input band and the width of the output pixel block is maximized.

Specifically, if the output pixel block after extension of the width of the output pixel block does not fit within the input band height in the height direction of the input pixel coordinate system, the width of the output pixel block is reduced as described above.

If the output pixel block after extending the width of the output pixel block fits within the input band height in the height direction of the input pixel coordinate system, here the controller 5 does not reduce the width of the output pixel block as described above, and leaves the width as is.

Figure 7:
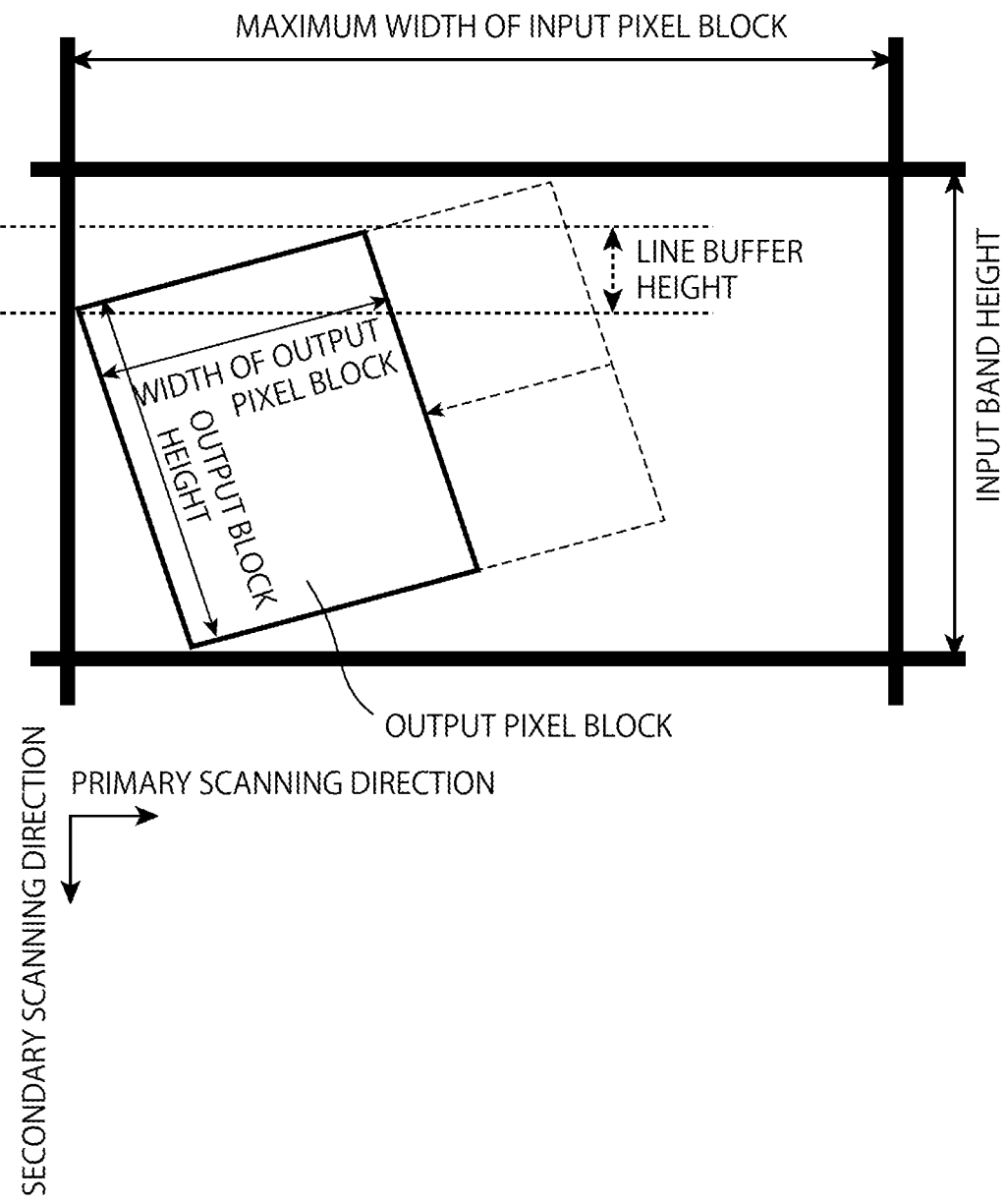
FIG. 7 is a diagram for explaining the reduction of the width of an output pixel block based on a restriction imposed by a line buffer height in the first embodiment.

FIG. 7 is a diagram for explaining the reduction of the width of an output pixel block based on a restriction imposed by a line buffer height in the first embodiment.

Next, in the block size determination processing, as shown in FIG. 7, if the number of pixel lines of the input pixel block corresponding to one pixel line of the output pixel block of the current size (that is to say, the number of pixel lines of the input pixel block required to obtain one pixel line of the output pixel block in the rotation processing) exceeds the number of pixel lines (line buffer height) in the line buffer 3a, the controller 5 reduces the width of the output pixel block so that the number of pixel lines of the input pixel block corresponding to one pixel line of the output pixel block becomes less than or equal to the number of pixel lines in the line buffer.

If the number of pixel lines of the input pixel block corresponding to one pixel line of the output pixel block of the current size does not exceed the number of pixel lines in the line buffer 3a, here the controller 5 does not reduce the width of the output pixel block as described above, and leaves the width as is.

Then, the controller 5 sets the size of the input pixel block to the read circuit 2b based on the size of the output pixel block (output block height and width of the output pixel block) set in this manner.

Here, in the block size determination processing, initial values of the output block height and of the width of the output pixel block are set equal to each other.

Furthermore, the height of the input pixel block is made set less than or equal to the height of the input band, and the height of the output pixel block is set less than or equal to the height of the output band. In addition, the output pixel blocks in the output band do not overlap each other, and the input pixel blocks in the input band overlap each other.

Figure 8:
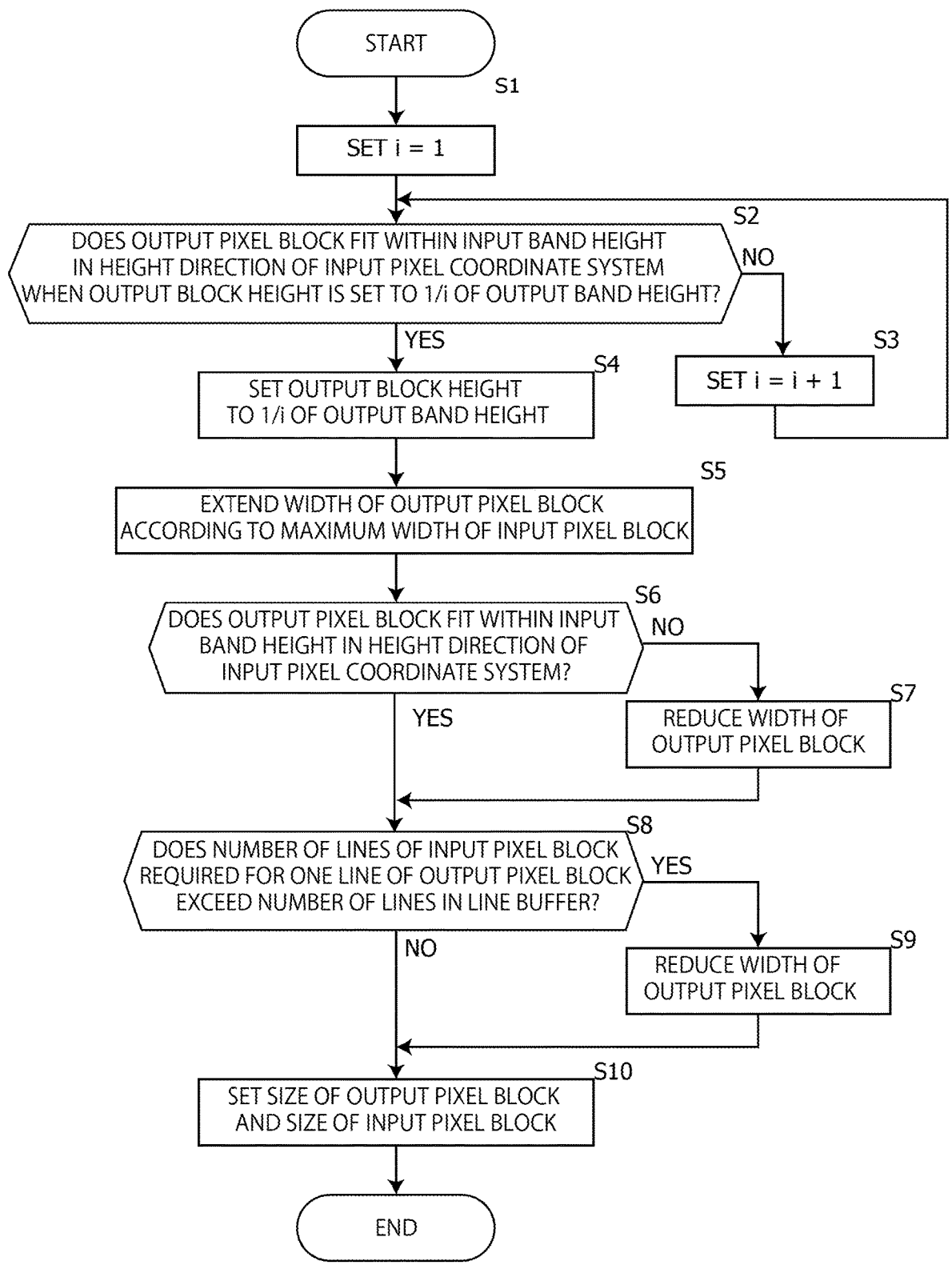
FIG. 8 is a flowchart for explaining the operation of an image processing device according to the first embodiment.

Next, the operation of the image processing device will be described. FIG. 8 is a flowchart for explaining the operation of the image processing device according to the first embodiment.

The controller 5 executes the following block size determination processing based on a specified rotation angle before the image processing device performs processing on the input image generated by the image reading unit 1.

The controller 5 first sets an initial value of 1 to a counter i (step S1), and determines whether or not the output pixel block fits within the input band height in the height direction of the input pixel coordinate system when the output block height is set to 1/i of the output band height (step S2).

If the output pixel block does not fit within the input band height in the height direction of the input pixel coordinate system when the output block height is set to 1/i of the output band height, the controller 5 increments the counter i by 1 (step S3), and returns to step S2.

If the output pixel block fits within the input band height in the height direction of the input pixel coordinate system when the output block height is set to 1/i of the output band height, the controller 5 sets the output block height to 1/i of the output band height based on the current value of the counter i (step S4).

Next, as described above, the controller 5 extends the width of the output pixel block according to the maximum width of the input pixel block (step S5).

Then, the controller 5 determines whether or not the output pixel block of the current size (height and width) fits within the input band height in the height direction of the input pixel coordinate system (step S6). If the output pixel block of the current size does not fit within the input band height in the height direction of the input pixel coordinate system, the controller 5 reduces the width of the output pixel block as described above (step S7).

Further, the controller 5 determines whether or not the number of pixel lines of the input pixel block required for one pixel line of the output pixel block of the current size (height and width) exceeds the number of pixel lines in the line buffer 3a (step S8). If the number of pixel lines of the input pixel block required for one pixel line of the output pixel block of the current size exceeds the number of pixel lines in the line buffer 3a, the controller 5 reduces the width of the output pixel block as described above (step S9).

Then, the controller 5 sets the size of the output pixel block set in this manner to the arithmetic processing circuit 3, and sets the size of the input pixel block required for an output pixel block of that size to the read circuit 2b (step S10).

In this manner, after executing block size determination processing, the block output unit 2, the arithmetic processing circuit 3, and a subsequent image processing unit perform pipeline processing on the input image generated by the image reading unit 1, thereby executing image processing which includes rotation processing.

At this time, the read circuit 2b selects input pixel blocks in order one-by-one, specifies the position of a selected input pixel block in the input band based on the rotation angle, reads the input pixel block in order one pixel line at a time from a specified position of the input pixel block, and outputs the input pixel block to the line buffer 3a. Then, the arithmetic unit 3b specifies the position of the output pixel block in the output band that corresponds to the input pixel block, reads the input pixel block one pixel line at a time from the line buffer 3a, performs rotation processing to generate the output pixel block one pixel line at a time, and writes the output pixel block to the specified position in the output band buffer 4 mentioned above. For example, as shown in FIG. 3, the positions of the input pixel blocks 101-1, 101-2 and 101-3 are specified in order, and the pixel values of output pixel blocks 102-1, 102-2 and 102-3 that correspond to the input pixel blocks 101-1, 101-2 and 101-3 are derived.

According to the first embodiment described above, the read circuit 2b reads an input pixel block from the input band stored in the input band buffer 2a, and outputs the input pixel block to the line buffer 3a, which has a specific number of pixel lines. The arithmetic processing circuit 3 reads the pixel lines of the input pixel block from the line buffer 3a, executes rotation processing of the input pixel block to derive an output pixel block, and outputs the output pixel block to the output band buffer 4 as part of the output band. The controller 5 sets the size of the input pixel block to the read circuit 2b according to the rotation angle in the rotation processing. Specifically, the controller 5 executes block size determination processing for determining the size of the output pixel block, and sets the size of the input pixel block to the read circuit 2b based on the output block height of the output pixel block and the width of the output pixel block. In the block size determination processing, the controller 5: (a) sets the output block height of the output pixel block to the largest integer fraction of the output band height of the output band so that the output pixel block fits within the input band in the input pixel coordinate system; (b) extends the width of the output pixel block so that the output pixel block fits within the specific maximum width of the input pixel block in the input pixel coordinate system; (c) if the output pixel block after extending the width of the output pixel block does not fit within the input band in the input pixel coordinate system, reduces the width of the output pixel block so that the output pixel block fits within the input band and the width of the output pixel block is maximized; and (d) if the number of pixel lines of the input pixel block corresponding to one pixel line of the output pixel block exceeds the number of pixel lines in the line buffer 3a, reduces the width of the output pixel block so that the number of pixel lines of the input pixel block corresponding to one pixel line of the output pixel block after reducing the width of the output pixel block becomes less than or equal to the number of pixel lines in the line buffer 3a.

As a result, the output pixel blocks are densely arranged in the output band and sections in the input pixel blocks unnecessary for the output pixel blocks are also reduced, and therefore, a decrease in the calculation efficiency of the band after rotation processing, and in the usage efficiency of storage areas, can be suppressed.

In the image processing device, if image processing is carried out by hardware (that is to say, a dedicated circuit) for each band of the image after rotation, the height of the output pixel block is preferably set to an integer fraction of the output band height from the perspective of the calculation efficiency of the band and the usage efficiency of storage areas.

However, in the image processing device described above, because the size of the input pixel block is determined first and the size of the output pixel block is determined accordingly based on the size of the input pixel block, there is a possibility that the height of the output pixel block will not become an integer fraction of the output band height, causing a decrease in the calculation efficiency of the band, and in the usage efficiency of storage areas.

According to the first embodiment described above, it is possible to obtain an image processing device capable of suppressing a decrease in the calculation efficiency of the band after rotation processing, and in the usage efficiency of storage areas.

Second Embodiment

In the second embodiment, the arithmetic processing circuit 3 executes filter processing using a specific filter size (N×M) together with the rotation processing performed the arithmetic unit 3b. The filter processing refers to processing which calculates the product sum of the pixel values of central target pixels and peripheral pixels thereof, and a specific filter coefficient of a matrix that corresponds to the filter size.

Consequently, the input pixel block is required to have a size that supports an area in which a peripheral region that corresponds to the filter size of the filtering processing is added to the output pixel block. For example, if the width of the filter size is N pixels and the height of the filter size is M pixels, the width of each peripheral region in the horizontal direction (forward and backward in the primary scanning direction) of the output pixel block is (N−1)/2 pixels, and the height of each peripheral region in the vertical direction (forward and backward in the secondary scanning direction) of the output pixel block is (M−1)/2 pixels.

Therefore, in the block size determination processing, the controller 5 determines the size (height and width) of the output pixel block with consideration of the peripheral region mentioned above, and specifies the size of the input pixel block accordingly.

Figure 9:
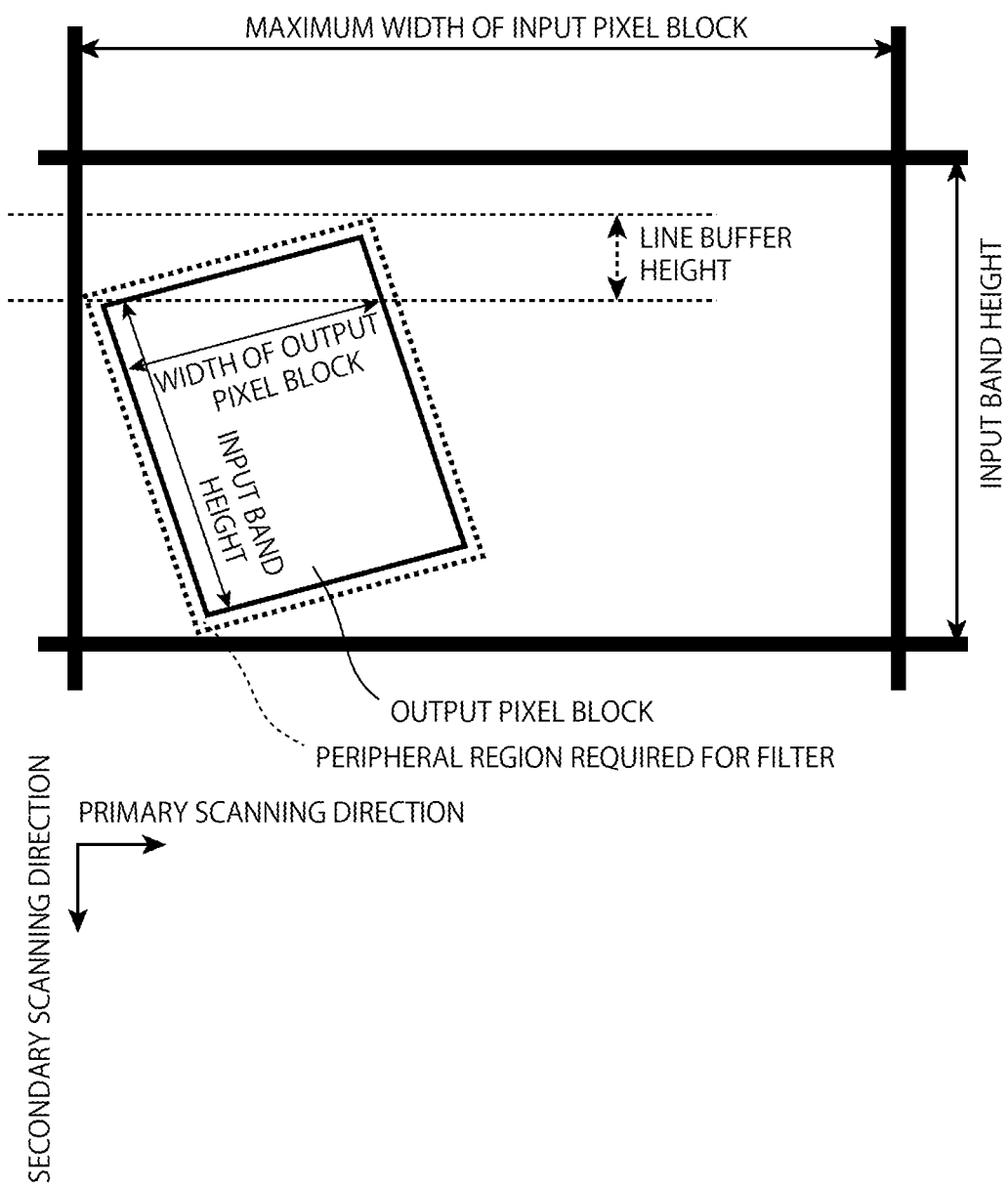
FIG. 9 is a diagram for explaining block size determination processing in a second embodiment.

FIG. 9 is a diagram for explaining block size determination processing in the second embodiment.

Specifically, as shown in FIG. 9, in the block size determination processing, the controller 5: (a) sets the output block height of the output pixel block to the largest integer fraction of the output band height of the output band so that a peripheral region of the output pixel block corresponding to a filter size of the filter processing described above and the output pixel block fit within the input band; (b) extends the width of the output pixel block so that the peripheral region and the output pixel block fit within the specific maximum width of the input pixel block; (c) if the peripheral region and the output pixel block after extending the width of the output pixel block do not fit within the input band, reduces the width of the output pixel block so that the peripheral region and the output pixel block fit within the input band and the width of the output pixel block is maximized; (d) if the number of pixel lines of the input pixel block corresponding to one pixel line of the peripheral region and the output pixel block after reducing the width of the output pixel block exceeds the number of pixel lines in the line buffer 3, reduces the width of the output pixel block a so that the number of pixel lines of the input pixel block corresponding to one pixel line of the peripheral region and the output pixel block after reducing the width of the output pixel block becomes less than or equal to the number of pixel lines in the line buffer 3a; and (e) sets the size of the input pixel block to the read circuit 2b based on the output block height of the output pixel block and the width of the output pixel block.

The other configurations and operations of the image processing device according to the second embodiment are the same as in the first embodiment, and the description is therefore omitted.

Note that various changes and modifications to the embodiments described above will be apparent to those skilled in the art. Such changes and modifications may be made without departing from the spirit and scope of the subject matter and without diminishing the intended advantages. That is to say, such changes and modifications are intended to be included in the scope of the claims.

For example, in the first embodiment and the second embodiment described above, a scaling process may be performed together with the rotation process in the arithmetic unit 3b. In that case, the output pixel block is mapped to the input pixel coordinate system based on the rotation angle in the rotation processing and the scaling factor of the scaling process, and the block size determination processing described above is performed in the input pixel coordinate system based on an output pixel block mapped in this manner. Furthermore, the size of the input pixel block required for deriving the output pixel block is specified from the size of the output pixel block.

The present disclosure is applicable to image forming devices such as a multifunction peripheral.

What is claimed is:

1. An image processing device comprising:
   an input band buffer which stores an input band obtained by dividing an input image;
   a read circuit which reads input pixel blocks from the input band stored in the input band buffer, and outputs the input pixel blocks to a line buffer having a specific number of pixel lines;
   an output band buffer which stores an output band;
   an arithmetic processing circuit which reads pixel lines of the input pixel blocks from the line buffer, executes rotation processing of the input pixel blocks to derive output pixel blocks, and stores the output pixel blocks in the output band buffer as part of the output band; and
   a controller which determines the size of each of the output pixel blocks according to the rotation angle in the rotation processing, and sets the size of each of the input pixel blocks to the read circuit based on the size of the output pixel block,
   wherein the controller:
   (a) executes block size determination processing for determining the size of the output pixel block; and
   (b) in the block size determination processing, (b1) sets an output block height of the output pixel block to the largest integer fraction of an output band height of the output band so that the output pixel block fits within the input band in an input pixel coordinate system, (b2) extends the width of the output pixel block so that the output pixel block fits within a specific maximum width of the input pixel block in the input pixel coordinate system, (b3) if the output pixel block after extending the width of the output pixel block does not fit within the input band in the input pixel coordinate system, reduces the width of the output pixel block so that the output pixel block fits within the input band and the width of the output pixel block is maximized, (b4) if the number of pixel lines of the input pixel block corresponding to one pixel line of the output pixel block in the input pixel coordinate system exceeds the number of pixel lines in the line buffer, reduces the width of the output pixel block so that the number of pixel lines of the input pixel block corresponding to one pixel line of the output pixel block after reducing the width of the output pixel block becomes less than or equal to the number of pixel lines in the line buffer, and (b5) sets the size of the input pixel block to the read circuit based on the output block height of the output pixel block and the width of the output pixel block.

2. The image processing device according to claim 1, wherein
   the arithmetic processing circuit executes filter processing together with the rotation processing, and
   the controller, in the block size determination processing, (b1) sets the output block height of the output pixel block to the largest integer fraction of the output band height of the output band so that a peripheral region of the output pixel block corresponding to a filter size of the filter processing and the output pixel block fit within the input band in the input pixel coordinate system, (b2) extends the width of the output pixel block so that the peripheral region and the output pixel block fit within a specific maximum width of the input pixel block in the input pixel coordinate system, (b3) if the peripheral region and the output pixel block after extending the width of the output pixel block do not fit within the input band, reduces the width of the output pixel block so that the peripheral region and the output pixel block fit within the input band and the width of the output pixel block is maximized, (b4) if the number of pixel lines of the input pixel block corresponding to one pixel line of the peripheral region and output pixel block exceeds the number of pixel lines in the line buffer, reduces the width of the output pixel block so that the number of pixel lines of the input pixel block corresponding to one pixel line of the peripheral region and output pixel block after reducing the width of the output pixel block becomes less than or equal to the number of pixel lines in the line buffer, and (b5) sets the size of the input pixel block to the read circuit based on the output block height of the output pixel block and the width of the output pixel block.

3. The image processing device according to claim 1, wherein
   initial values of the output block height and of the width of the output pixel block in the block size determination processing are equal to each other.

4. The image processing device according to claim 1, wherein
   the height of the input pixel block is less than or equal to the height of the input band,
   the height of the output pixel block is less than or equal to the height of the output band,
   the output pixel blocks in the output band do not overlap each other,
   and the input pixel blocks in the input band overlap each other.

* * * * *